United States Patent
Jiang et al.

(10) Patent No.: US 9,636,706 B2
(45) Date of Patent: May 2, 2017

(54) TITANIUM DIOXIDE FREE MULTILAYER COATING SYSTEM

(75) Inventors: Siyuan Jiang, Shanghai (CN); Qianqian Li, Shanghai (CN); Jiakuan Sun, Shanghai (CN)

(73) Assignee: Rohm and Haas Company, Philadelphia, PA (US)

( * ) Notice: Subject to any disclaimer, the term of this patent is extended or adjusted under 35 U.S.C. 154(b) by 343 days.

(21) Appl. No.: 12/972,652

(22) Filed: Dec. 20, 2010

(65) Prior Publication Data

US 2011/0159309 A1 Jun. 30, 2011

(30) Foreign Application Priority Data

Dec. 25, 2009 (CN) .......................... 2009 1 0262561

(51) Int. Cl.
*B05D 7/00* (2006.01)
*C08K 7/22* (2006.01)
*C09D 7/00* (2006.01)
*C09D 7/12* (2006.01)

(52) U.S. Cl.
CPC ............ *B05D 7/534* (2013.01); *C09D 7/005* (2013.01); *C09D 7/125* (2013.01); *C09D 7/1283* (2013.01); *C09D 7/1291* (2013.01); *B05D 2502/00* (2013.01); *B05D 2520/00* (2013.01); *B05D 2602/00* (2013.01); *C08K 7/22* (2013.01); *Y10T 428/31928* (2015.04)

(58) Field of Classification Search
CPC B05D 7/534; B05D 2502/00; B05D 2520/00; B05D 2602/00; Y10T 428/31928; C08K 7/22; C09D 7/005; C09D 7/125; C09D 7/1283; C09D 7/1291
See application file for complete search history.

(56) References Cited

U.S. PATENT DOCUMENTS

| | | |
|---|---|---|
| 4,427,836 A | 1/1984 | Kowalski |
| 4,594,363 A | 6/1986 | Blankenship |
| 4,880,842 A | 11/1989 | Kowalski |
| 4,970,241 A | 11/1990 | Kowalski |
| 5,147,940 A | 9/1992 | Biale |
| 5,639,805 A | 6/1997 | Park et al. |
| 6,043,319 A | 3/2000 | Lee et al. |
| 6,277,917 B1 | 8/2001 | Jurgetz et al. |
| 2002/0068805 A1* | 6/2002 | Futami et al. ............. 526/307.5 |
| 2004/0034147 A1* | 2/2004 | Zama ............................ 524/460 |
| 2004/0219360 A1* | 11/2004 | Walt et al. .................... 428/402 |
| 2005/0171274 A1* | 8/2005 | Even ............................ 524/556 |
| 2006/0009587 A1* | 1/2006 | Kim et al. .................... 525/242 |
| 2007/0218291 A1* | 9/2007 | Chiou et al. ............... 428/411.1 |
| 2008/0041544 A1* | 2/2008 | Tsavalas et al. .......... 162/157.6 |
| 2009/0324843 A1 | 12/2009 | Wegner et al. |

FOREIGN PATENT DOCUMENTS

| | | |
|---|---|---|
| CN | 1436800 A | 8/2003 |
| EP | 0267726 A2 | 5/1988 |
| EP | 1754729 A1 | 2/2007 |
| EP | 1754730 A1 | 2/2007 |
| JP | 63135408 A | 6/1988 |
| JP | 7196747 A | 8/1995 |
| JP | 10251556 A | 9/1998 |
| JP | 11209438 A | 8/1999 |
| JP | 2001247820 A | 9/2001 |
| JP | 200499700 A | 4/2004 |
| JP | 2004249526 A | 9/2004 |
| JP | 2007275701 A | 10/2007 |
| WO | 2008000509 A2 | 1/2008 |

OTHER PUBLICATIONS

European Search Report issued in Application No. EP 10195248, dated Apr. 8, 2011.
Wagner et al.; "Raising the barriers to dirt"; European Coatings Journal; Oct. 2010; pp. 1-11.
V M Braund, Cost Effectiveness of Calcined Clays in Latex Paints, Polymers Paint and Colour Journal, Oct. 31, 1979.
Ultracarb™ U5 in Contract Matt Emulsion Paint, Micofine Minerals Limited, Paint & Resin, Dec. 1989.

* cited by examiner

*Primary Examiner* — Kevin R Kruer
(74) *Attorney, Agent, or Firm* — Karl E. Stauss; Cantor Colburn LLP

(57) ABSTRACT

This invention relates to a multilayer coating system derived from Titanium dioxide free aqueous coating compositions. The multilayer coating system comprises at least two layers including a layer of base coating which provides good hiding function for substrates and a second layer of clear top coating which provides surface protection functions for the coating system. The base coating composition comprises an opaque (co)polymer having at least one void per (co)polymer particle. The top coating composition comprises a duller (co)polymer chosen from a multi-stage (co)polymer, a single stage crosslinked (co)polymer, and mixtures thereof.

10 Claims, No Drawings

TITANIUM DIOXIDE FREE MULTILAYER COATING SYSTEM

BACKGROUND

This patent application claims the benefit of the earlier filed Chinese Patent Application serial number 200910262561.8 filed on Dec. 25, 2009.

This invention relates to a multilayer coating system derived from Titanium dioxide ($TiO_2$) free aqueous coating compositions. The multilayer coating system comprises at least two layers including a layer of base coating which provides good hiding function for substrates, and a second layer of clear topcoat which provides surface protection functions for the coating system such as stain resistance, dirt pick up resistance, wet scrub resistance and solvent resistance with a soft touch feel and low gloss appearance.

$TiO_2$ is a prime pigment in the architectural coating industry to provide hiding function for the substrates. Due to constant rise of $TiO_2$ price and extremely energy consuming problem in $TiO_2$ manufacture process, paint technologists are trying to reduce the use of $TiO_2$ from long time ago. In white latex paints, $TiO_2$ could be reduced in use by finding alternatives for $TiO_2$ or reformulating paints above critical pigment volume concentration (CPVC) without sacrifice of their essential coating surface properties.

One typical example of above researches is to use calcined clay to partially replace $TiO_2$ in latex coating formulations (Cost Effectiveness of Calcined Clays in Latex Paints, V. M. Braund, Polymers Paint and Colour Journal, Oct. 31, 1979). And later many other extender suppliers devoted to develop $TiO_2$ replacements, such as ULTRACARB™ U5 (ULTRACARB™ U5 in Contract Matt Emulsion Paint, Micofine Minerals Limited, Paint & Resin, December, 1989). However, all these coating formulations disclosed still need an effective concentration of $TiO_2$ to get acceptable opacity or hiding property while maintaining other surface properties such as stain resistance, wet scrub resistance, and etc.

Synthetic opaque polymer beads are useful opacifying agents, which can be selected from a variety of beads according to mechanical and/or optical requirements of the coating film and properties of the beads. Among these, beads containing microvoids introduce a synergistic effect which makes a significant contribution to the total light scattering for hiding function. Some opaque polymers were developed by Rohm and Haas Company as the optimum in polymeric extenders with a positive contribution to opacity without sacrifice of film properties, as disclosed in U.S. Pat. No. 4,427,836, U.S. Pat. No. 4,594,363, U.S. Pat. No. 4,880,842 and U.S. Pat. No. 4,970,241. EP 1,754,729 and EP 1,754,730 disclosed aqueous dispersions of film-forming polymeric particles which can provide a high degree of white light scattering when the film dries. However, above extenders and opaque polymers with or without binding capability were used as partial replacements for $TiO_2$ in the literature and the coating formulations still need considerable $TiO_2$ to contribute to hiding function while maintaining mechanical properties of the film. Otherwise, some important surface performance, such as hiding, gloss, burnish resistance and scrub resistance will be unacceptable.

There are challenges for the other way, reformulating paints above CPVC, which prone to generate more air voids between discrete and unconnected particles in the film. Such paints forms coating films containing interconnected air voids which cause increase of film porosity and decrease of paint qualities including wet scrub resistance, stain resistance and chalking resistance.

The problem addressed by this invention is to find a $TiO_2$ free coating system possesses both a decent hiding property and a combination of surface properties including low gloss, soft touch, burnish resistance, easy clean function, dirt pick up resistance and solvent resistance.

STATEMENT OF THE INVENTION

The first aspect of the present invention provides a multilayer coating system comprising a layer of base coating which provides optical appearance on a substrate and a layer of clear top coating which provides surface protection and mechanical properties, wherein the multilayer coating system is free of $TiO_2$, wherein the base coating is derived from an aqueous coating composition B comprising, in percentage by dry weight based on the total dry weight of the composition B, from 18% to 55%, an opaque (co)polymer a) having at least one void per (co)polymer a) particle, and from 45% to 82%, a film forming (co)polymer b) compatible with the (co)polymer a), wherein the clear top coating is derived from an aqueous coating composition T comprising, in percentage by dry weight based on the total dry weight of the composition T, from 20% to 85%, a duller (co)polymer c) chosen from a multi-stage (co)polymer, a single stage crosslinked (co) polymer, and mixtures thereof; wherein the (co)polymer c) having an average particle size of from 1 to 20 µm, and having Tg of from −60° C. to 75° C., and from 15% to 80%, a film forming (co)polymer d) compatible with the (co)polymer c).

The second aspect of the present invention provides a method of applying the $TiO_2$ free multilayer coating system of the first aspect, comprising the steps of: i) applying the aqueous coating composition B on a bare or primed substrate and dry to form said base coating, and ii) applying the aqueous coating composition T on the substrate coated with the base coating and dry to form said clear top coating.

The third aspect of the present invention provides a coated substrate prepared by method of the second aspect of the present invention.

DETAIL DESCRIPTION

For the purpose of describing the components in the compositions of this invention, all phrases comprising parenthesis denote either or both of the included parenthetical matter and its absence. For example, the phrase "(co) polymer" includes, in the alternative, polymer, copolymer and mixtures thereof; the phrase "(meth)acrylate" means acrylate, methacrylate, and mixtures thereof, and the phrase "(meth)acrylic" used herein means acrylic, methacrylic, and mixtures thereof.

As used herein, unless otherwise indicated, the term "$TiO_2$ free" or "free of $TiO_2$" shall mean substantially free from $TiO_2$, containing trace amount of $TiO_2$ as an impurity, or below an effective amount of $TiO_2$ in coating formulations; likewise, the term "free of metal oxide" shall mean substantially free from metal oxide, containing trace amount of metal oxide as an impurity, or below an effective amount of metal oxide in coating formulations free of metal oxide; and the term "free of inorganic pigment" shall mean substantially free from inorganic pigment, containing trace amount of inorganic pigment as an impurity, or below an effective amount of inorganic pigment in coating formulations.

As used herein, the term "multilayer coating system" shall mean coating structure comprising at least two layers of coating film on surface of substrate.

As used herein, the term "aqueous" shall mean water or water mixed with 50 wt % or less, based on the weight of the mixture, of water-miscible solvent.

As used herein, the term "polymer" shall include resins and copolymers.

As used herein, the term "synthetic rubber" shall refer to ethylene-propylene-diene (EPDM), styrene-butadiene copolymers, silicone rubber, urethane rubber, diene rubber, and thermoplastic polyolefin (TPO).

As used herein, the term "duller" refers to polymeric particles having significant light scattering properties including both forward scattering and backscattering and in internal and external reflection, and such uncontrolled interaction of light, when used in the top coating of the present invention, causes loss of gloss and preferably without sacrifice of transparency appearance of the coated article.

As used herein, the term "acrylic" shall mean (meth) acrylic acid, (meth)alkyl acrylate, (meth)acrylamide, (meth) acrylonitrile and modified forms thereof, such as, for example, (meth)hydroxyalkyl acrylate.

As used herein, the term "compatible" shall mean that a component or polymer itself is capable of forming a homogeneous blend with another component or polymer.

As used herein, the term "extender" shall mean a particulate inorganic material having a refractive index of less than or equal to 1.8 and greater than 1.3 and includes, for example, calcium carbonate, clay, calcium sulfate, aluminosilicates, silicates, zeolites, and diatomaceous earth.

As used herein, the term "average diameter" refers to the median particle size of a distribution of particles as determined by electrical impedance using a MULTISIZER™ 3 Coulter Counter (Beckman Coulter, Inc., Fullerton, Calif.), per manufacturer's recommended procedures. The median is defined as the size wherein 50 wt % of the particles in the distribution are smaller than the median and 50 wt % of the particles in the distribution are larger than the median.

As used herein, the term "60° Gloss" refers to the gloss of a coated article or coating, measured at a 60° viewing angle using a MICRO-TRI™ Gloss meter (from BYK-Gardner GmbH, Geretsried, Del.).

As used herein, the term "low Tg monomer" shall mean any monomer, a homopolymer of which will have a Tg of 20° C. or below.

As used herein, unless otherwise indicated, the term "molecular weight" refers to the weight average molecular weight of a polymer as measured by gel permeation chromatography (GPC) against a polyacrylic acid standard.

As used herein, the term "Tg" shall mean glass transition temperature measured by differential scanning calorimetry (DSC) taking the inflection point in the thermogram as the Tg value. In the case of a multi-stage polymer, the reported Tg value shall be the weighted average of the observed inflection points in the thermogram. For example, a two stage polymer consisting of 80% soft first stage and 20% hard second stage polymer having two DSC inflection points, one at −43° C. and one at 68° C., will have a reported Tg of −20.8° C.

As used herein, the term "vinyl" or "vinyl monomer" shall mean acrylic, vinyl ester, vinyl ether, monovinyl aromatic compounds, such as styrene and α-methyl styrene, and vinyl halides.

As used herein, the term "wt %" shall mean percent by weight.

All ranges recited are inclusive and combinable. For example, an average diameter of 1 μm or more, or 2 μm or more, or 4 μm or more and up to 20 μm, or up 15 μm, will include ranges of 1 μm or more to 20 μm or less, 1 μm or more to 15 μm or less, 2 μm or more to 15 μm or less, 2 μm or more to 20 μm or less, 4 μm or more to 15 μm or less, and 4 μm or more to 20 μm or less.

Unless otherwise indicated, all temperature and pressure units are standard temperature and pressure (STP).

In the present invention, the aqueous coating composition B comprises an opaque (co)polymer a) used as hollow-sphere polymeric pigments, which is selected from film forming and non-film forming emulsion (co)polymers containing at least one void per (co)polymer particle. During the drying of the base coating composition B, the water in the void diffuses through the (co)polymer shell and leaves air voids. Due to the difference in refractive index between air and the surrounding polymer, light is effectively scattered and thus contributing to coating opacity and substrate hiding. Preferably, the opaque (co)polymer a) is hydrophobic. Examples of the opaque (co)polymer are hollow-sphere (co)polymers such as, for example, the multistage polymers described in U.S. Pat. No. 7,435,783 and commercial products such as RHOPAQUE™ OP-62, Ultra E, and OP-3000, available from DOW Chemical Company.

The aqueous coating composition B of the present invention comprises a (co)polymer b) compatible with the opaque (co)polymer a), which is used as a binder for base coating film forming. Suitable (co)polymer b) may be chosen from (co)polymers having molecular weight of from 10,000 to 5,000,000 and having a Tg of from −35° C. to 60° C., for example, 30° C. or less. Preferably, the binder (co)polymer b) is acrylic.

In a preferred embodiment, the binder (co)polymer b) comprises a single stage acrylic emulsion copolymer and the opaque (co)polymer a) comprises a multistage acrylic copolymer.

In one embodiment, the opaque (co)polymer a) is prepared by sequential emulsion polymerization, as described in U.S. Pat. No. 7,435,783.

In the present invention, the aqueous coating composition T comprises a duller (co)polymer c) composed of particles chosen from a multi-stage (co)polymer, a single stage crosslinked (co)polymer, and mixtures thereof. The (co)polymer c) has a Tg of from −60° C. to 75° C., preferably from −10° C. to 60° C.

Suitable duller (co)polymer c) may include, for example, polymers chosen from single staged polymers, such as crosslinked t-butyl acrylate (t-BA) (co)polymer, crosslinked 2-ethylhexyl (meth)acrylate (co)polymer, crosslinked sec-butyl (meth)acrylate (co)polymer, crosslinked ethyl (meth) acrylate (co)polymer, crosslinked methyl acrylate (co)polymer, crosslinked hexyl (meth)acrylate (co)polymer, crosslinked isobutyl (meth)acrylate (co)polymer, crosslinked benzyl (meth)acrylate (co)polymer, crosslinked isopropyl (meth)acrylate (co)polymer, crosslinked decyl (meth) acrylate (co)polymer, crosslinked dodecyl (meth)acrylate (co)polymer, crosslinked n-butyl (meth)acrylate (co)polymer, crosslinked C21 to C30 alkyl (meth)acrylates, crosslinked vinyl propionate (co)polymer, urethane polymer, melamine polymer, silicone-functional (meth)acrylate copolymer, a copolymer of any of the crosslinked polymers with an acrylic monomer the copolymer having a Tg of from −10° C. to 75° C., a copolymer of any of the crosslinked polymers with a vinyl monomer the copolymer having a Tg of from −10° C. to 75° C.; multi-stage polymers, such as acrylic multi-stage polymer, vinyl multi-stage polymer, multi-stage synthetic rubber copolymer, multi-stage urethane copolymer, water-dispersible graft copolymer, mixtures and combinations thereof, such as polyurethane acrylate). Preferably, the duller (co)polymer c) comprise single stage crosslinked (co)polymers which are the polymerization product of more than 50 wt % of monomers which would yield a homopolymer film having a Tg of from −10° C. to 75° C. More preferably, the duller (co)polymer c) comprise multi-stage polymers.

The duller (co)polymer c) comprises (co)polymer particles having an average diameter of 1-20 µm, preferably having a narrow particle size distribution (PSD). Suitable duller particles have a minimum average diameter of 1 µm, preferably 2 µm, more preferably 5 µm. When the average diameter of the particles is smaller than 1 µm, the particles tend to aggregate and become difficult to disperse adequately in the aqueous composition. Suitable duller particles have a maximum average diameter of 20 µm, preferably 15 µm, more preferably 8 µm. When a substantial part of the duller particles is smaller than the desired size scope are present in the compositions, the matting efficiency of the duller decreases. When a substantial part of the duller particles is larger than the desired size scope are present in the compositions, the coating surface is less attractive and clarity decreases.

In one preferable embodiment of the present invention, the duller (co)polymer c) comprises multi-stage (co)polymers with, for example, a core-shell or layered structure, such as a multilobal structure. The multi-stage duller particles comprise a polymeric core phase and one or more polymeric shell phases, preferably comprise a graded refractive index (grin) composition. The core may be prepared from a variety of vinyl monomers, and may be a rubbery or glassy polymer. The core may be prepared from polymerization or copolymerization of such monomers as diolefins, e.g. butadiene or isoprene; vinyl aromatic monomers, e.g. styrene or chlorostyrene; vinyl esters, e.g. vinyl acetate or vinyl benzoate; acrylonitrile; methacrylonitrile; (meth)acrylate esters, e.g. methyl methacrylate, butyl methacrylate, phenyl methacrylate, ethyl acrylate, butyl acrylate, 2-ethylhexyl acrylate, and benzyl acrylate; vinyl chloride; and other monomers polymerizable by free-radical initiation.

In another preferable embodiment, the duller (co)polymer c) comprise multi-stage polymers having rubbery cores, i.e. having a Tg of 20° C. or less, or 10° C. or less. Rubbery cores may comprise synthetic or natural rubbers, or, preferably, acrylic rubbers. The acrylic rubber cores comprise alkyl acrylate copolymers, the alkyl group having from 2 to 8 carbon atoms, copolymerized with from 0 to 10 wt %, preferably up to about 5 wt %, or up to 1 wt %, or 0.05 wt % or more, of one or more crosslinker, based on the total weight of core monomers, from 0 to 10 wt %, preferably up to 5 wt %, or up to 2.5 wt %, and, preferably, 0.1 wt % or more, or 0.5 wt % or more, of one or more graftlinker, based on the total weight of core monomers, and from 0 to 50 wt % of one or more copolymerizable vinyl monomer, based on the total weight of core monomers. Of the one or more polymer shells surrounding the acrylic rubber, the outermost shell is compatible with the binder (co)polymer d). The shell(s) may comprise from 0 to 40 wt % of the multistage particles.

In the rubbery core polymers of the duller (co)polymer c), the preferred alkyl acrylate is t-BA or BA. The copolymerizable vinyl monomer or monomers may be monovinyl monomers, such as alkyl methacrylates and monovinyl arenes, e.g. styrene. Said monovinyl arenes include such monoethylenically unsaturated aromatic monomers as styrene, alkylstyrenes such as methylstyrene and ethylstyrene, other substituted vinylbenzenes wherein the substituents do not interfere with polymerization, and similar vinyl polycyclic aromatic monomers. The refractive index of the core polymer and of binder (co)polymer may, optionally, match exactly to produce an almost completely transparent composition. In one example, a preferred two-stage 5 µm average diameter copolymer comprises rubbery poly(BA) crosslinked with allyl methacrylate and has a hard shell of poly methyl methacrylate (pMMA), the shell comprising 20 wt % of the particle.

Crosslinking monomers suitable for use in the core polymer are generally di- or poly-ethylenically unsaturated monomers copolymerizable with the other core monomers, wherein the ethylenically unsaturated groups have approximately equal reactivity, such as, for example, divinylbenzene (DVB); glycol di- and tri-(meth)acrylates, such as, for example, 1,4-butylene glycol dimethacrylate, 1,2-ethylene glycol dimethacrylate, and 1,6-hexanediol diacrylate; triol tri(meth)acrylates, diallyl phthalate, and the like. The preferred crosslinking monomers are butylene glycol diacrylates.

Graftlinking monomers suitable for use in the core polymer generally are di- or poly-ethylenically unsaturated monomers copolymerizable with the other core monomers and having sufficiently low reactivity of the unsaturated groups to allow significant residual unsaturation to remain in the core polymer subsequent to its polymerization, such as, for example allyl methacrylate (ALMA), allyl acrylate, diallyl maleate, allyl acryloxypropionate and the like. The preferred graftlinking monomer is ALMA.

Surrounding the core of a multi-stage polymer particle is one or more shell of polymer. The shell polymers may comprise from about 0.1 to about 40%, preferably, from about 5 to about 40%, and, more preferably, from about 15 to about 35%, based on the total particle weight.

The outer shell polymer of multi-stage duller particles c) in the aqueous coating composition T is compatible with binder (co)polymer d). For example, a shell of poly(methyl methacrylate) will be compatible with a matrix polymer of poly(methyl methacrylate), or poly(vinyl chloride). Likewise, single stage duller (co)polymer c) shall be compatible with binder (co)polymer d). For example, the shell of a multi-stage duller polymer c) or a crosslinked copolymer duller c) may be compatible with the binder (co)polymer d) as a result of chemical similarity, as in the above example of methyl methacrylate polymers for the shell and the matrix polymer, or it may be determined empirically to be compatible, as in a copolymer of t-BA copolymerized with about 25 to about 30%, based on total monomer weight, of acrylonitrile or styrene; this copolymer duller is also compatible with any of a poly(methyl methacrylate), other (co)poly(meth)acrylate binder.

The duller (co)polymer c) particles may be made by any process which results in particles having an average particle diameter of 1-20 µm. Particles at the upper end of the desired size range may be made by suspension polymerization techniques but this requires post polymerization particle classification. Preferably, the duller (co)polymer c) is formed by emulsion polymerization, as described in US patent application No. 2007/0218291.

The aqueous coating composition T of the present invention comprises a (co)polymer d) compatible with the duller (co)polymer c), which is used as a binder for clear top coating film forming. Suitable binder (co)polymer d) may be chosen from binders having molecular weight of from 10,000 to 5,000,000 and having a Tg of from −35° C. to 60° C., for example, 30° C. or less.

In a preferred embodiment, the binder (co)polymer d) comprises a single stage acrylic emulsion copolymer and the duller (co)polymer c) comprises a multistage acrylic copolymer.

Suitable binders, used as either or both of the binder b) and the binder d) in the present invention, may comprise aqueous emulsion (co)polymers or aqueous emulsions, i.e. oil-in-water, of preformed (co)polymers chosen from acrylic, vinyl, such as vinyl acetate or vinyl acetate-ethylene, polyurethanes, siloxanes, natural rubbers, synthetic rubber polymers, such as styrene-butadiene (SBR) block copolymers, and mixtures and combinations thereof. Preferably, the binder (co)polymer b) and/or the binder (co)polymer d) are acrylic.

Above said acrylic emulsion (co)polymers may comprise the polymerization reaction product of (i) from 30 to 99.9 wt %, or 60 wt % or more or 70 wt % or more or up to 95 wt % of one or more acrylic monomer; (ii) from 0 to 60 wt %, or up to 30 wt % of one or more copolymerizable ethylenically unsaturated monomer; (iii) from 0 to 10 wt %, preferably, 0.1 wt % or more, or, more preferably, 0.5 wt % or more, or up to 5 wt % of one or more monoethylenically unsaturated carboxylic acid or anhydride monomer, or salt thereof; (iv) from 0 to 10 wt %, preferably, up to 5 wt % of one or more polar copolymerizable monoethylenically unsaturated monomer; (v) from 0 to 20 wt %, preferably, from 0 to 10 wt % of one or more functional copolymerizable monoethylenically unsaturated monomers; and (vi) from 0 to 10 wt %, preferably from 0 to 5 wt %, all proportions based on the weight of all monomers used to make the (co)polymer, of one or more crosslinking or graftlinking monomer.

Suitable acrylic monomers (i) may include, for example, one or more C1-30 alkyl (meth)acrylate monomer, C5-30 cycloalkyl (meth)acrylate, or C5-30 (alkyl)aryl (meth)acrylate monomer, including, for example, methyl methacrylate, isodecyl methacrylate and low Tg acrylic monomers. Suitable low Tg monomers include but are not limited to ethyl acrylate (EA), butyl acrylate (BA), t-butyl acrylate (t-BA), 2-ethylhexyl acrylate (2-EHA), lauryl acrylate, lauryl methacrylate, cetyl (meth)acrylate, eicosyl (meth)acrylate, cetyleicosyl (meth)acrylate, behenyl (meth)acrylate, methyl acrylate, butyl methacrylate (BMA). Preferred binders may comprise (co)polymers which are the polymerization product of monomers chosen from EA, BA, and 2-EHA.

Suitable copolymerizable ethylenically unsaturated monomers (ii) may include, for example, silicon or fluorine containing (meth)acrylates, conjugated dienes, such as butadiene; vinyl acetate or other vinyl esters; vinyl monomers, such as styrene or substituted styrenes, including α-methyl styrene, vinyl chloride, and vinylidene chloride.

Suitable copolymerizable monoethylenically-unsaturated carboxylic acid monomer (iii), based on the weight of the polymer, such as, for example, acrylic acid, methacrylic acid, crotonic acid, itaconic acid, fumaric acid, maleic acid, monomethyl itaconate, monomethyl fumarate, monobutyl fumarate, maleic anhydride, styrylic acid, and the anhydrides and salts thereof. Preferred carboxylic acid monomers are acrylic acid, (meth)acrylic acid, and itaconic acid. Such monomers confer water dispersibility to acrylic and vinyl emulsion polymer binders.

Emulsion polymer binders may, alternatively, be made water dispersible by chemical modifications known in the art. For example, vinyl acetate polymers may be partially hydrolyzed, and polyolefins may be acid functionalized, e.g. via maleation.

Suitable polar copolymerizable monoethylenically unsaturated monomers (iv) may include, for example, phosphoethyl (meth)acrylate, 2-(meth)acrylamido-2-methylpropane sulfonic acid (AMPS™, Lubrizol Corp., Wickliffe, Ohio), hydroxyethyl (meth)acrylate, hydroxypropyl (meth)acrylate, aminoalkyl (meth) acrylates, N-vinyl pyrollidinone, (meth)acrylamides, N-vinylimidazoles and cationic monomers such as (meth)acrylamidopropyl trimethylammonium chloride [(M)APTAC], and diallyldimethylammonium chloride (DADMAC).

Suitable functional copolymerizable monoethylenically unsaturated monomers (v) may include, for example, monoethylenically unsaturated monomers containing an acetoacetate or acetoacetamide group, such as, for example, vinyl acetoacetate, acetoacetoxyethyl (meth)acrylate, acetoacetoxypropyl (meth)acrylate, allyl acetoacetate, acetoacetoxybutyl (meth)acrylate, 2,3-di(acetocacetoxy)propyl (meth)acrylate, vinyl acetoacetamide, and acetoacetoxyethyl (meth)acrylamideacetoacetoxyalkyl (meth)acrylates; diacetoneacrylamide, and monoethylenically unsaturated monomers containing nitrile group (meth)acrylonitrile, and are, preferably, acetoacetoxyethyl methacrylates (AAEM). Such monomers help to make acrylic and vinyl emulsion polymer binders more resistant to chemicals.

Suitable crosslinking or graftlinking poly-ethylenically unsaturated monomers (vi) comprise same monomers for the duller (co)polymer preparation.

Each of the binder (co)polymer b) and the binder (co)polymer d) may take the form of particles having an average diameter of 30-1000 nm, or 50 nm or more, 100 nm or more. For architecture application, the polymer in the emulsions take the form of particles having an average diameter of 30 to 500 nm, preferably 50 or more nm, or, preferably, up to 400 nm.

In one embodiment of the present invention, suitable binder (co)polymer b) and/or d) for architectural coating applications may comprise the copolymerization reaction product of from 30 to 90 wt %, of low Tg monomers, copolymerized with 70 to 10 wt % of (i) one or more acrylic and/or (ii) copolymerizable ethylenically unsaturated monomer other than a low Tg monomer, 0.5 to 10 wt % of (iii) one or more ethylenically unsaturated carboxylic acid or anhydride monomer, or salt thereof, and the remainder comprising one or more, and/or one or more of any (iv) polar, (v) functional, or (vi) crosslinking or graftlinking monomer, all monomer proportions based on the weight of all monomers used to make the (co)polymer.

For either or both of the binder (co)polymer b) and the binder (co)polymer d), polymerization techniques used to prepare aqueous emulsion-polymers and multi-stage emulsion polymers are well known in the art, for example, U.S. Pat. Nos. 4,325,856, 4,654,397, and 4,814,373. In multistage polymerization processes, at least two stages differing in composition are formed in a sequential fashion and in any order.

The compatibility of the polymer combinations, such as used in the present invention, the opaque (co)polymer a) and the binder (co)polymer b), and the duller (co)polymer c) and the binder (co)polymer d), are known to those skilled in the art, and others may readily be determined by routine experimentation, as for example by preparing blends of proposed duller and binder polymers and examining the blends for such evidence of compatibility as absence of haze, existence of a single glass transition temperature, and the like.

To form the aqueous compositions base coating or the multifunctional clear top coating of the present invention, the opaque (co)polymer a) and the aqueous film forming binder (co)polymer b), or the aqueous duller c) and the aqueous film forming binder (co)polymer d) may simply be mixed. In use such compositions comprise from 40 to 90 wt % of water, preferably from 40 to 80 wt %, based on the total weight of the composition, for use in architectural and industrial applications. Conversely, the total solids of the aqueous composition B or T may range from 10 to 60 wt %, based on the total weight of the composition B or T, more preferably from 20 to 60 wt % in architectural and industrial applications.

The opaque (co)polymer a) shall be used in an appropriate amount of, in percentage by dry weight based on the total dry weight of the aqueous coating composition B, from 18% to 55%, preferably from 26% to 44%, more preferably, from 30% to 40%. Low percentage of said (co)polymer a), such as below 18%, causes insufficient hiding property of the base coating. On the contrary, when above 55%, the film surface prone to crack.

Suitable amounts of the binder (co)polymer b) in the base coating composition B may range from 45% to 82%, in percentage by dry weight based on the total dry weight of the aqueous composition B, preferably from 56% to 74%, more preferably from 60% to 70%.

Suitable amounts of the duller (co)polymer c) in the multifunctional clear top coating composition T may range from 20 to 85%, in percentage by dry weight based on the total dry weight of the aqueous composition T, desirably from 20 to 65%, or preferably from 65 to 85%.

Suitable amounts of the binder (co)polymer d) in multifunctional clear top coating composition T may range from 15 to 80%, based on the total dry weight of the aqueous composition T, desirably from 15 to 35%, or 35 to 80%.

The aqueous base coating and multifunctional top coating composition of the present invention may take the form of waterborne dispersions, e.g. alkaline, anionic or non-ionic, and may further comprise additives, such as, for example, feel additives, additional dullers, flow or wetting agents, thickeners or rheology modifiers or their mixtures, curing agents, pigments or colorants, opacifiers, extenders, antioxidants and plasticizers.

The aqueous coating composition T may comprise additional dullers other than the (co)polymer c) for further reducing gloss via light scattering and surface roughening. The additional dullers may be selected from known inorganic dullers, such as, for example, silica, fume silica, alumina, silicates, (sub)carbonates, e.g. calcium carbonate, kaolin, phyllosilicates, talc, zinc oxides, zirconium oxides, and alkali(ne) hydroxides having average diameters from submicron up to 30 μm, essentially free of $TiO_2$, preferably free of metal oxides, more preferably free of inorganic pigments; or may comprise other organic dullers, such as, for example, 2-30 μm average diameter polytetrafluoroethylene, polyethylene, silicone, polyurethane, urea-formaldehyde or polyvinylidene fluoride beads. The organic dullers may also fortify film strength. Useful proportions may include up to 30 wt %, on a solids basis, of the total amount of duller (co)polymer c) plus additional dullers.

Extenders or colorants may be added in the base coating composition B and/or clear top coating composition T so as to color the composition. The clear top coating will be a transparent or translucent film. Preferably the multifunctional top coating is transparent.

Other materials are optionally included in the adjuvants including solvents; biocides; wetting agents; humectants; surfactants; neutralizers; buffers; free-thaw additives; antifoaming agents; tackifiers and etc.

In addition, water for dilution may be added, such as, for example, for use at remote site to reduce the total solids of the compositions B and T to a desired range. Accordingly, aqueous compositions may be shipped in any stable concentrated form, such as, for example, aqueous compositions comprising surfactants, flow agents or wetting agents and having solids contents, e.g., as high as 80-90 wt %, based on the total weight of the aqueous composition.

It is essential that the base coating compositions B are free of $TiO_2$, preferably free of metal oxide, more preferably free of inorganic pigment, where hiding of substrate is provided by air voids, The suitable dry film thickness of base coating to provide good hiding may range from 2 mil or more, preferably 3 mil or more, more preferably 4 mil or more. The suitable dry film thickness of multifunctional top coating may range from 1 mil or more, preferably 2 mil or more.

The substrate may be bare or pre-painted substrates such as, but not limited to, bare or pre-painted cement, ceramic, tile, painting, glass, plastic, wood, metal, woven and nonwoven textile, and paper, etc.

In an embodiment of the present invention, the method of using the multilayer coating system comprises forming the base coating and multifunctional top coating compositions, applying the base coating composition to one or more bare or pre-painted substrates and drying, optionally, curing, the base coating composition followed by applying the multifunctional top coating composition on the top of the base coating and drying, optionally, curing, the multifunctional top coating composition. Drying may be performed in a known manner such as, for example, air drying or heat drying at temperatures that will not damage the substrate and coating, e.g. 150° C. or below, or 100° C. or below.

The base coating composition B and multifunctional top coating composition T may be applied to architectural or industrial substrates by spraying methods such as, for example, air-atomized spray, air-assisted spray, airless spray, high volume low pressure spray, and air-assisted airless spray, by roll coating or knife coating.

The key advantage of the present invention is that the coating system comprising at least one base coating and at least one clear top coating is derived from $TiO_2$ free coating compositions. Hiding of the coated surface is provided by air voids in the base coating film. The top coating provides a unique combination of surface properties including low gloss, soft touch, burnish resistance, transparency, easy clean function, good washability, dirt pick up resistance and solvent resistance.

In the present specification, the technical features in each preferred technical solution and more preferred technical solution can be combined with each other to form new technical solutions unless indicated otherwise. For briefness, the applicant omits the descriptions for these combinations. However, all the technical solutions obtained by combing these technical features should be deemed as being literally described in the present specification in an explicit manner.

EXAMPLES

In the following examples, the abbreviations have the meanings given, as follows:

EA=ethyl acrylate; BA=butyl acrylate; AN=acrylonitrile; AA=acrylic acid; EHA=2-ethylhexyl acrylate; AAEM=2-acetoacetylethyl methacrylate; ALMA=allyl methacrylate;

DVB=divinyl benzene; MMA=methyl methacrylate; BMA=butyl methacrylate; t-BA=tert-butyl acrylate; STY=styrene; w./o.=without.

TABLE 1

Starting materials used in coating compositions

| Material | Function | Chemical nature | Supplier |
|---|---|---|---|
| KATHON ™ LXE | Biocide | Methyl- and chloroisothiazolinone | DOW |
| AMP-95 | Base | 2-methyl-2-amino-propanol | DOW |
| TEXANOL ™ | Coalescent | Trimethylpentanediol isobutyrate | Eastman |
| RHOPLEX ™ VSR-50 | Binder | Acrylic polymer | DOW |
| ACRYSOL ™ RM-8W | Thickener | Hydrophobically modified ethylene oxide urethane | DOW |
| ROPAQUE ™ Ultra E | Opacifying agent | Opaque polymer | DOW |
| Propylene Glycol | Solvent | Propylene Glycol | |
| OROTAN ™ 1288 | Pigment dispersant | Polyacid | DOW |
| TRITON ™ CF-10 | Wetting agent | Nonionic surfactant | DOW |
| DREWPLUS ™ L-475 | Defoamer | Silicone-type | Ashland |
| TI-PURE ™ R-706 | Pigment | Titanium dioxide | DuPont |
| DB-80 | Extender | Calcined clay | Wuhan Yinghe Chemical Lt. Co. |
| CC-500 | Extender | Calcium carbonate | Guangfu Building Materials Group |
| CELITE ™ 499 | Extender | Diatomite | Celite Corp. |
| PRIMAL ™ AC-268 | Binder | Acrylic polymer | DOW |
| ACRYSOL ™ TT-935 | Thickener | Hydrophobically modified alkali soluble emulsion | DOW |
| ACRYSOL ™ RM-2020NPR | Thickener | Hydrophobically modified ethylene oxide urethane | DOW |

Test Methods

Gloss determination: Surface gloss was determined by using a MICRO-TRI™ Gloss meter to measure the gloss of dry coating surface at 60 and 85 degree geometry.

Opacity determination: Contrast ration of the dry film was determined by a color spectrophotometer (Color•guide sphere spectrophotometer, BYK Gardner)

Stain resistance: To test the stain performance of the multiple coating system, a black vinyl chart P-121-10N (Leneta) was coated by the base coating composition followed by drying it for one day in a constant temperature room (CTR, 25° C., 50% R.H.). Then, half area of the base coating was coated by the multifunctional top coating composition followed by drying it for another 6 days in CTR. A minimum of 4 hydrophobic and 4 hydrophilic stains were used. Hydrophobic stains such as lipstick, pencil, ball point, crayon, permanent marker were applied on the sample surface across the base coating and top coating sections by pressing and moving these stains. Hydrophilic stains including red wine, coffee, black tea, green tea, soybean sauce and ink were applied by placing cheese clothes saturated with the corresponding stains on sample surface across the base coating and top coating sections and allowing them stay on sample surface for 2 hours. Prior to stain test, excessive liquid stains were wiped off with a paper towel or cheese cloth. The stain removal test was conducted on a modified scrub machine with a boat filled with a 3M™ commercial sponge saturated with 1% household detergent solution. 1 KG weight was placed on the boat to ensure that all the samples were tested under the same pressure. Each sample was washed for 100 cycles. Before reading, the sample charts were rinsed using regular water followed by complete drying at room temperature. Stain performance was evaluated by visual ranking following the standard described in Table 2.

When perform the stain test of conventional $TiO_2$ contained coating, use the conventional $TiO_2$ contained coating as base coating.

TABLE 2

Ranking standard for stain performance

| Hydrophobic or hydrophilic stain resistance and removal ranking | State |
|---|---|
| 5 | No stain or trace stains left |
| 4 | 70% to 90% stain removed |
| 3 | More than 50% stain removed |
| 2 | Less than 50% removed or obvious stain marks left |
| 1 | Almost no stain removed |

Burnish resistance: The burnish resistance was evaluated by the gloss change of coating surface due to mechanical wash. The coatings for burnish resistance test were obtained by casting test paints on form P-121-10N Black Vinyl Leneta chart with a 3 mil Bird Application, then drying for 1 week in a CTR. Mechanical wash was conducted using the stain test machine w/o using stains. The coating surface was washed for 200 cycles followed by rinsing and drying at room temperature. The surface gloss was measured before and after washing. Smaller gloss change indicates better burnish resistance.

Dirt pick up resistance (DPUR): The DPUR test samples were prepared by applying base coating composition with a 120 μm wet film thickness with a roller on asbestos panels, and drying for 4 hours in a CTR, followed by casting another 80 μm wet film thickness base coating with the same roller and drying for overnight in a CTR. The multifunctional top coatings composition was applied on the dry base coating surface by casting 100 μm wet film thickness using brush or roller and drying for 6 days in CTR. Synthetic ash according to China National Standard was mixed with deionized water with certain ratio to prepare the contamination source (ash slurry) for accelerated DPUR test. This ash slurry was applied on the surface of the prepared asbestos panels using brush and the samples were dried in CTR for 2 hours before being rinsed with water for 1 minute. This process was repeated for 5 cycles prior to surface reflectance measurement. The DPUR was characterized by the reflectance change before and after the DPUR test. The results were ranked to different levels from 1 to 5. 5 is the best and 1 is the worst.

Soft touch determination: Soft touch property was determined by the feeling of hand touch ranked by Y or N. Y mean it has soft touch property while N means it has not soft touch property.

Wet-scrub resistance: The scrub resistance of paints was determined using a modified version of the ASTM Test Method D 2486-74A. As compared to the standard ASTM method, there were four modifications in the test method used here. First, the scrub medium for the paints was a 0.5 wt % household detergent solution to replace the abrasive scrub medium in ASTM Test Method D 2486-74A. Second, the coating films were laid down on vinyl charts vertical to the longer side. Third, there were no shims on the aluminum metal plates of scrub machines. The last difference was the material used for making the hairs of the test brush. The brushes used here were made of pig hairs rather than nylon fibers. On each vinyl chart, four coatings were applied with always making one of them derived from the same paint as control and three others being samples so that relative ratings between control and samples can be obtained. For a given paint, four coating specimens were made and the final rating was obtained by averaging the results of the four specimens. The coatings were dried for 7 days in a constant temperature room with a temperature of 25° C. and a humidity of 50% prior to scrub test.

Solvent resistance: The coatings for solvent resistance were obtained by casting the test paints on form P-121-10N Black Vinyl Leneta chart with a 7 mil Bird Application and drying for 7 days in a CTR. Cheesecloth saturated with ethanol was used to scrub the surface of the tested films for 50 cycle with applying certain pressure. The solvent resistance was determined by evaluating the percentage of the film left on the chart. The results were visually ranked to different levels from 1 to 5. 5 is the best and 1 is the worst.

Example 1

This example illustrated preparation of an emulsion polymer for use in preparing the core/shell particles which are the preferred dullers of the present invention. Unless otherwise noted, the terms "charged" or "added" indicate addition of all the mixture at once. The following mixtures were prepared:

TABLE 3

Mixtures for core/shell particles preparation

| Mixture | Component | Parts By Weight |
|---|---|---|
| A | Water | 208 |
|  | Sodium Carbonate | 0.38 |
| B | BA | 98 |
|  | Butylene Glycol Diacrylate | 0.25 |
|  | ALMA | 2.0 |
|  | 10% aqueous Sodium Dodecylbenzenesulfonate | 4.0 |
|  | Water | 40 |
| C | Potassium Persulfate | 0.063 |
|  | Water | 35 |

A reactor equipped with stirrer and condenser and blanketed with nitrogen was charged with Mixture A and heated to 82° C. To the reactor contents was added 15% of Mixture B and 25% of Mixture C. The temperature was maintained at 82° C. and the reaction mixture was stirred for 1 hour, after which the remaining Mixture B and Mixture C were metered in to the reactor, with stirring, over a period of 90 minutes. Stirring was continued at 82° C. for 2 hours, after which the reactor contents were cooled to room temperature. The average diameter of the resulting emulsion particles was 0.2 μm, as measured by light scattering using a BI-90 PLUS™ instrument from Brookhaven Instruments Company, 750 Blue Point Road, Holtsville, N.Y. 11742.

Example 2

In this example the particles in the emulsion of Example 1 were grown to an average diameter 0.5 μm using an emulsion of BA and STY. The following mixtures were prepared:

TABLE 4

Mixtures for 0.5 μm particles preparation

| Mixture | Component | Parts by Weight |
|---|---|---|
| A | Water | 185 |
|  | Sodium Carbonate | 0.081 |
|  | Polymer Emulsion from Preparation Example 1 | 35 |
| B | BA | 82 |
|  | STY | 18 |
|  | 10% aqueous Sodium Dodecylbenzenesulfonate | 2.5 |
|  | Water | 32 |
| C | 1-Hexanethiol | 19 |
|  | 10% aqueous Sodium Dodecylbenzenesulfonate | 2.8 |
|  | Water | 11 |
| D | Potassium Persulfate | 0.11 |
|  | Water | 18 |
| E | t-Butyl Hydroperoxide | 0.18 |
|  | Water | 3.7 |
| F | 3% aqueous Sodium Formaldehyde Sulfoxylate | 4.1 |

Mixture A was added to the reactor of Example 1 and heated to 88° C. with stirring. Mixtures B, C and D were metered in to the reactor over a period of 3 hours, after which the temperature was maintained at 88° C., with stirring, for 90 minutes. The reactor contents were cooled to 65° C., Mixtures E and F were added, and the reactor contents were maintained at 65° C., with stirring, for 1 hour, after which the reactor contents were cooled to room temperature. The resulting emulsion polymer particles had an average diameter of 0.5 μm as measured by light scattering using a BI-90 PLUS™ instrument.

Example 3 and 4

In each of the following Examples, 3 and 4, a reactor equipped with a stirrer and condenser and blanketed with nitrogen was charged with Mixture A and heated to 92° C. Mixtures B and C were separately emulsified with a hand-held high shear mixer until a stable emulsion was obtained (0.8-3 minutes). Mixture B was then slowly fed into the reactor over one hour. With the reactor contents at 64° C., Mixture C was added as a shot to start the reaction which was complete about 1.5 hours later. Next, where applicable, mixtures D, E and F, were separately metered in to the reactor over a period of 90 minutes. The resulting mixture was cooled to room temperature and analyzed by examined by optical microscopy and a Coulter Counter. The resulting mixture was cooled to room temperature and analyzed by optical microscopy and a Coulter Counter.

Example 3

5 μm Crosslinked BA Particle

This example illustrates growing 5 μm average diameter particles from 0.5 mm average diameter emulsion seed particles.

The following mixtures were prepared and processed as stated above:

TABLE 5

Mixtures for 5 μm particles preparation

| Mixture | Component | Parts by Weight |
|---|---|---|
| A | Water | 1830 |
|   | 0.5 μm average size emulsion seed particles from Preparation Example 2 | 3.7 |
| B | Water | 248 |
|   | 23% aqueous sodium dodecylbenzenesulfonate | 9.0 |
|   | BA | 556 |
|   | ALMA | 23 |
| C | Water | 10 |
|   | 23% aqueous sodium dodecylbenzenesulfonate | 1.2 |
|   | t-Butyl Peroctoate | 4.05 |

Most of particles were uniformly sized and nearly 5 μm in average diameter. Some of them were in range of 1 to 20 μm.

Example 4

6 μm Average Size Core-Shell Particle Duller

This example illustrates a one-pot process for polymerizing an outer shell of methyl methacrylate and ethyl acrylate onto the core polymer of Example 3.

The following mixtures were prepared and processed as stated above:

TABLE 6

Mixtures for 6 μm particles preparation

| Mixture | Component | Parts by Weight |
|---|---|---|
| A | Water | 1830 |
|   | 0.5 μm average size emulsion seed particles from Preparation Example 2 | 3.7 |

TABLE 6-continued

Mixtures for 6 μm particles preparation

| Mixture | Component | Parts by Weight |
|---|---|---|
| B | Water | 248 |
|   | 23% aqueous sodium dodecylbenzenesulfonate | 9.0 |
|   | BA | 556 |
|   | ALMA | 23 |
| C | Water | 10 |
|   | 23% aqueous sodium dodecylbenzenesulfonate | 1.2 |
|   | t-Butyl Peroctoate | 4.05 |
| D | Water | 50 |
|   | 23% aqueous sodium dodecylbenzenesulfonate | 1.8 |
|   | MMA | 139 |
|   | EA | 5.8 |
| E | Water | 5.8 |
|   | Sodium formaldehyde sulfoxylate | 0.44 |
| F | Water | 5.8 |
|   | t-Butyl hydroperoxide | 0.65 |

Most of the resulting particles were uniformly sized and about 6 μm in average diameter. Some of them were in range of 1 to 20 μm.

Example 5

Base Coating Composition Preparation

The ingredients listed in following table were added using a conventional lab mixer.

TABLE 7

Formulations of base coating compositions

| Ingredient (g) | Paint 1 | Paint 2 | Paint 3 | Paint 4 | Paint 5 |
|---|---|---|---|---|---|
| ROPAQUE ™ Ultra E | 173.25 | 229.80 | 289.2 | 346.91 | 405.06 |
| RHOPLEX ™ VSR-50 | 513.77 | 439.79 | 368.98 | 294.28 | 220.69 |
| TEXANOL ™ | 14.29 | 13.45 | 12.73 | 11.90 | 11.10 |
| ACRYSOL ™ RM-2020 NPR | 15.35 | 16.20 | 15.15 | 16.35 | 16.2 |
| KATHON ™ LXE | 1.0 | 1.0 | 1.0 | 1.0 | 1.0 |
| ACRYSOL ™ RM-8W | 6.25 | 6.70 | 8.2 | 9.3 | 10.1 |
| DI water | 276.1 | 293.06 | 304.74 | 320.26 | 335.86 |
| Total weight | 1000 | 1000 | 1000 | 1000 | 1000 |
| Total weight solids (%) | 28.57 | 26.90 | 25.46 | 23.80 | 22.19 |

Example 6

Multifunctional Top Coating Composition Preparation

The ingredients listed in following table (let down) were added with stirring using a conventional lab mixer.

TABLE 8

Formulations of top coating compositions

| | Paint 6 | Paint 7 | Paint 8 | Paint 9 |
|---|---|---|---|---|
| Description of Formulation | | | | |
| Duller dispersion | of Example 4 | | | |
| Duller dispersion: weight solids (wt %) | 32.3 | | | |

TABLE 8-continued

Formulations of top coating compositions

|  | Paint 6 | Paint 7 | Paint 8 | Paint 9 |
|---|---|---|---|---|
| Bead/Binder weight solid ratio | 20/80 | 50/50 | 80/20 | 85/15 |
| Formulation | grams | grams | grams | grams |
| Letdown |  |  |  |  |
| Duller dispersion | 200.0 | 200.0 | 335.30 | 335.30 |
| RHOPLEX ™ VSR-50 | 567.9 | 141.8 | 59.45 | 28.00 |
| TEXONAL ™ | 12.9 | 3.2 | 1.35 | 0.64 |
| ACRYSOL ™ RM-8W | 10.0 | 4.0 | 10.0 | 11.5 |
| KATHON ™ LXE | 1.0 | 1.0 | 1.0 | 1.0 |
| AMP-95 | 0.5 | 0.5 | 0.5 | 0.5 |
| Total weight | 792.3 | 350.5 | 409.22 | 376.94 |
| Top coating Solids (wt %) | 40.8% | 37.0% | 33.1% | 33.9% |

TABLE 9-continued

Formulations of conventional coating composition with $TiO_2$
Paint 10 formulation

| Material | Weight (g) |
|---|---|
| Letdown |  |
| PRIMAL ™ AC-268 | 206.52 |
| TEXANOL ™ | 6.58 |
| ACRYSOL ™ RM-2020NPR | 15.26 |
| PRIMAL ™ TT-935 | 8.26 |
| AMP-95 | 0.34 |
| Water | 167.84 |
| Total | 1000.00 |

TABLE 10

Property test results

| Base coating | Paint 1 | Paint 3 | Paint 5 | Paint 10 | Paint 3 | Paint 1 | Paint 2 | Paint 3 | Paint 4 | Paint 5 | Paint 3 | Paint 3 |
|---|---|---|---|---|---|---|---|---|---|---|---|---|
| Top coating | No | No | No | No | Paint 6 | Paint 7 | Paint 7 | Paint 7 | Paint 7 | Paint 7 | Paint 8 | Paint 9 |
| 60° Gloss | 81.3 | 85.5 | 87.7 | 4.7 | 15.7 | 3.7 | 3.6 | 3.6 | 3.7 | 3.7 | 2.0 | 1.5 |
| 85° Gloss | 96.5 | 97.0 | 98.0 | 15.0 | 20.7 | 11.6 | 11.5 | 11.5 | 11.5 | 11.6 | 8.9 | 8.5 |
| Opacity* C.R. % | 88.56 | 93.25 | 90.05 | 92.0 | 93.00 | 88.0 | 90.67 | 92.92 | 92.2 | 89.78 | 93.05 | 93.00 |
| 60° Gloss[#] | — | — | — | 5.6 | 17.6 | 4.0 | 4.0 | 4.0 | 4.0 | 3.9 | — | — |
| 85° Gloss[#] | — | — | — | 25.7 | 25.6 | 12.9 | 12.7 | 12.8 | 12.8 | 12.8 | — | — |
| Stain Resistance | 5 | 5 | 1 | 1 | 5 | 5 | 5 | 5 | 5 | 5 | — | — |
| Dirt Pick Up Resistance | 1 | 3 | 2 | — | 1 | 3 | 3 | 3 | 3 | 3 | 5 | 5 |
| Wet scrub resistance | >5000 | >5000 | 25 | ~2000 | >5000 | >5000 | >5000 | >5000 | >5000 | >5000 | — | — |
| Solvent Resistance | 2 | 1 | 1 | 1 | 5 | 5 | 5 | 5 | 5 | 5 | — | — |
| Soft Touch | N | N | N | N | Y | Y | Y | Y | Y | Y | Y | Y |

*Opacity: indicates hiding property of coating systems.
[#]Gloss after burnishing testing Example 7

Conventional Paint with $TiO_2$

A paint was prepared using the following procedure. The ingredients listed in Table 9 (grind) were mixed using a high speed Cowles disperser. The ingredients listed in same table (let down) were added with stirring using a conventional lab mixer. Paint 10 was formulated as:

TABLE 9

Formulations of conventional coating composition with $TiO_2$
Paint 10 formulation

| Material | Weight (g) |
|---|---|
| Grind |  |
| Water | 90.50 |
| Propylene Glycol | 33.00 |
| OROTAN ™ 1288 | 7.70 |
| TRITON ™ CF-10 | 1.00 |
| DREWPLUS ™ L-475 | 1.00 |
| TI-PURE ™ R-706 | 160.00 |
| DB-80 | 69.00 |
| CC-500 | 203.00 |
| CELITE ™ 499 | 30.00 |

We claim:

1. A multilayer coating system comprising a layer of base coating which provides optical appearance on a substrate and a layer of clear top coating which provides surface protection and mechanical properties,
   wherein the multilayer coating system is free of extenders, $TiO_2$, and other inorganic pigments,
   wherein the base coating is derived from an aqueous coating composition B comprising, in percentage by dry weight based on the total dry weight of the composition B,
   from 18% to 55% of an opaque copolymer a) comprising a multi-stage copolymer having at least one void per copolymer a) particle, and
   from 45% to 82% of a film forming single-stage (meth)acrylic emulsion copolymer b) compatible with the copolymer a), and comprising:
   (i) from 30 to 99.9 wt % of one or more C1-30 alkyl (meth)acrylate monomers having a $T_g$ of less than 20° C.;
   (ii) from 0 to 60 wt % of one or more copolymerizable ethylenically unsaturated monomers other than the monomers having a $T_g$ of less than 20° C.; and (iii) from 0.1 to 10 wt % of one or more monoethylenically unsaturated carboxylic acid or anhydride monomers, or salts thereof; and
having a $T_g$ of from −35° C. to 30° C.;
wherein all proportions are based on the weight of all monomers used to make the (co)polymer;
and
wherein the clear top coating is derived from an aqueous coating composition T comprising, in percentage by dry weight based on the total dry weight of the composition T,
from 20% to 85% of a multi-stage duller copolymer c) comprising, based on the total weight of copolymer (c), 60 to 95 wt % of a core of 95 to 99.1 wt % butyl acrylate and 0.1 to 5 wt % of allyl methacrylate and 5 to 40 wt % of a shell of copolymerized methyl methacrylate and ethyl acrylate; and having an average particle size of from 1 to 20 micrometers, and a $T_g$ of from −60°-C. to 75°-C., and
from 15% to 80% of a film forming single-stage (meth)acrylic emulsion copolymer d) compatible with the copolymer c), comprising:
(i) from 30 to 99.9 wt % of one or more C1-30 alkyl (meth)acrylate monomers having a $T_g$ of less than 20° C.; and
(ii) from 0 to 60 wt % of one or more copolymerizable ethylenically unsaturated monomers other than the monomers having a $T_g$ of less than 20° C.;
(iii) from 0.1 to 10 wt % of one or more monoethylenically unsaturated carboxylic acid or anhydride monomers, or salts thereof; and
having a $T_g$ of from −35° C. to 30° C.; and
wherein curing agents are absent from the top coating.

2. The multilayer coating system of claim 1, wherein the multilayer coating system is free of metal oxide.

3. The multilayer coating system of claim 1, wherein the amount of the (co)polymer a) is from 26% to 44%, and the amount of the (co)polymer b) is from 56% to 74%, in percentage by dry weight based on the total dry weight of the composition B.

4. The multilayer coating system of claim 3, wherein the amount of the (co)polymer a) is from 30% to 40%, and the amount of the (co)polymer b) is from 60% to 70%, in percentage by dry weight based on the total dry weight of the composition B.

5. The multilayer coating system of claim 1, wherein the amount of the (co)polymer c) is from 20 to 65 wt %, and the amount of the (co)polymer d) is from 35 to 80%, in percentage by dry weight based on the total dry weight of the composition T.

6. The multilayer coating system of claim 1, wherein the amount of the duller (co)polymer c) is from 65 to 85 wt %, and the amount of the binder (co)polymer d) is from 15 to 35%, in percentage by dry weight based on the total dry weight of the composition T.

7. The coating system of claim 1, wherein the film forming single-stage (meth)acrylic emulsion copolymer b) compatible with the copolymer a), and the film forming single-stage (meth)acrylic emulsion copolymer d) compatible with the copolymer c), independently consist of:
(i) from 60 to 99.5 wt % of the one or more C1-30 alkyl (meth)acrylate monomers having a $T_g$ of less than 20° C.;
(ii) from 0 to 30 wt % of the one or more copolymerizable ethylenically unsaturated monomers other than the monomers having a $T_g$ of less than 20° C.; and
(iii) from 0.1 to 10 wt % of one or more of acrylic acid, methacrylic acid, and itaconic acid.

8. The coating system of claim 7, wherein the (i) one or more C1-30 alkyl (meth)acrylate monomers having a $T_g$ of less than 20° C. are independently selected from ethyl acrylate, butyl acrylate, 2-ethyl hexyl acrylate, and combinations thereof.

9. A coated substrate prepared by method of applying the multilayer coating system of claim 1, comprising the steps of:
i) applying the aqueous coating composition B on a bare or primed substrate and drying to form said base coating, and
ii) applying the aqueous coating composition T on the substrate coated with the base coating and drying to form said clear top coating.

10. A method of applying the multilayer coating system of claim 1, comprising the steps of:
i) applying the aqueous coating composition B on a bare or primed substrate and drying to form said base coating, and
ii) applying the aqueous coating composition T on the substrate coated with the base coating and drying to form said clear top coating.

* * * * *